US 12,316,267 B2

United States Patent
Kuunsäde et al.

(10) Patent No.: US 12,316,267 B2
(45) Date of Patent: May 27, 2025

(54) STATOR FLUX ASSISTANCE AND OVEREXCITATION FOR EXTERNALLY EXCITED SYNCHRONOUS MACHINES

(71) Applicant: ABB Schweiz AG, Baden (CH)

(72) Inventors: Sina Kuunsäde, Helsinki (FI); Joni Heikkilä, Helsinki (FI); Mikko Kostiainen, Helsinki (FI)

(73) Assignee: ABB Schweiz AG, Baden (CH)

( * ) Notice: Subject to any disclaimer, the term of this patent is extended or adjusted under 35 U.S.C. 154(b) by 203 days.

(21) Appl. No.: 18/317,589

(22) Filed: May 15, 2023

(65) Prior Publication Data
US 2023/0387840 A1     Nov. 30, 2023

(30) Foreign Application Priority Data

May 24, 2022 (EP) .................................... 22175167

(51) Int. Cl.
| | | |
|---|---|---|
| *H02P 9/10* | (2006.01) | |
| *H02P 21/30* | (2016.01) | |
| *H02P 27/06* | (2006.01) | |

(52) U.S. Cl.
CPC ............... *H02P 9/10* (2013.01); *H02P 21/30* (2016.02); *H02P 27/06* (2013.01); *H02P 2207/05* (2013.01)

(58) Field of Classification Search
CPC ....... H02P 21/30; H02P 27/06; H02P 2207/05
See application file for complete search history.

(56) References Cited

U.S. PATENT DOCUMENTS

| | | | |
|---|---|---|---|
| 9,906,176 B2 | 2/2018 | Desabhatla | |
| 2006/0113939 A1* | 6/2006 | Saren | H02M 5/458 |
| | | | 318/434 |
| 2015/0002067 A1* | 1/2015 | Nondahl | H02P 21/00 |
| | | | 318/503 |

OTHER PUBLICATIONS

Ristanovic, Dragan, et al.; "Large Synchronous Motors as Drivers for Centrifugal Compressors in LNG Liquefaction Plants"; IEEE Transactions on Industry Applications, vol. 56, No. 6; IEEE Service Center, Piscataway, NJ, US; Jul. 28, 2020; 11 Pages.
Zhang, Kai, et al.; "Field Enhancing Model Predictive Direct Torque Control of Permanent Magnet Synchronous Machine"; IEEE Transactions on Energy Conversion, vol. 36, No. 4; IEEE Service Center, Piscataway, NJ, US; Apr. 1, 2021; 10 Pages.
European Search Report; Application No. EP 22 17 5167; Issued: Nov. 4, 2022; 2 Pages.

* cited by examiner

*Primary Examiner* — Zoheb S Imtiaz
(74) *Attorney, Agent, or Firm* — Whitmyer IP Group LLC

(57) ABSTRACT

An apparatus for a drive for driving an externally excited synchronous motor. The apparatus includes means for performing the following. The apparatus causes the drive to operate in a primary operating mode for achieving unity power factor. The apparatus monitors stator flux linkage load angle, stator flux linkage and torque references. In response to the stator flux linkage load angle reference, in a steady state, reaching or exceeding a pre-defined maximum allowed stator flux linkage load angle for steady state operation, the apparatus causes the drive to operate in a stator flux assistance operating mode. In the stator flux assistance operating mode, an increased stator flux linkage for allowing operation with the pre-defined maximum allowed stator flux linkage load angle with unity or maximized sub-unity power factor is used as the stator flux linkage reference.

15 Claims, 4 Drawing Sheets

STATOR FLUX ASSISTANCE AND OVEREXCITATION FOR EXTERNALLY EXCITED SYNCHRONOUS MACHINES

TECHNICAL FIELD

Various example embodiments relate to control of industrial processes.

BACKGROUND

In synchronous electric motors, the rotation of the motor shaft (i.e., of the rotor) is synchronized with the frequency of the supply current at steady state so that the rotation period is exactly equal to an integral number of alternating current (AC) cycles. One common way for controlling synchronous electric motors is the so-called vector control where the torque of the motor is controlled by controlling a stator current vector.

However, long field weakening range and/or short-time overloading of the synchronous machine are typical in demanding synchronous machine applications, for example, in the metals industry. With the traditional unity power factor control, the stator flux linkage load angle has a high value in the aforementioned operation points and thus the torque requirements cannot typically be reached.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method, and computer readable media for performing angular position error estimation for a synchronous motor.

BRIEF DESCRIPTION OF THE DRAWINGS

In the following, example embodiments will be described in greater detail with reference to the attached drawings, in which.

DETAILED DESCRIPTION

Figure 1A:
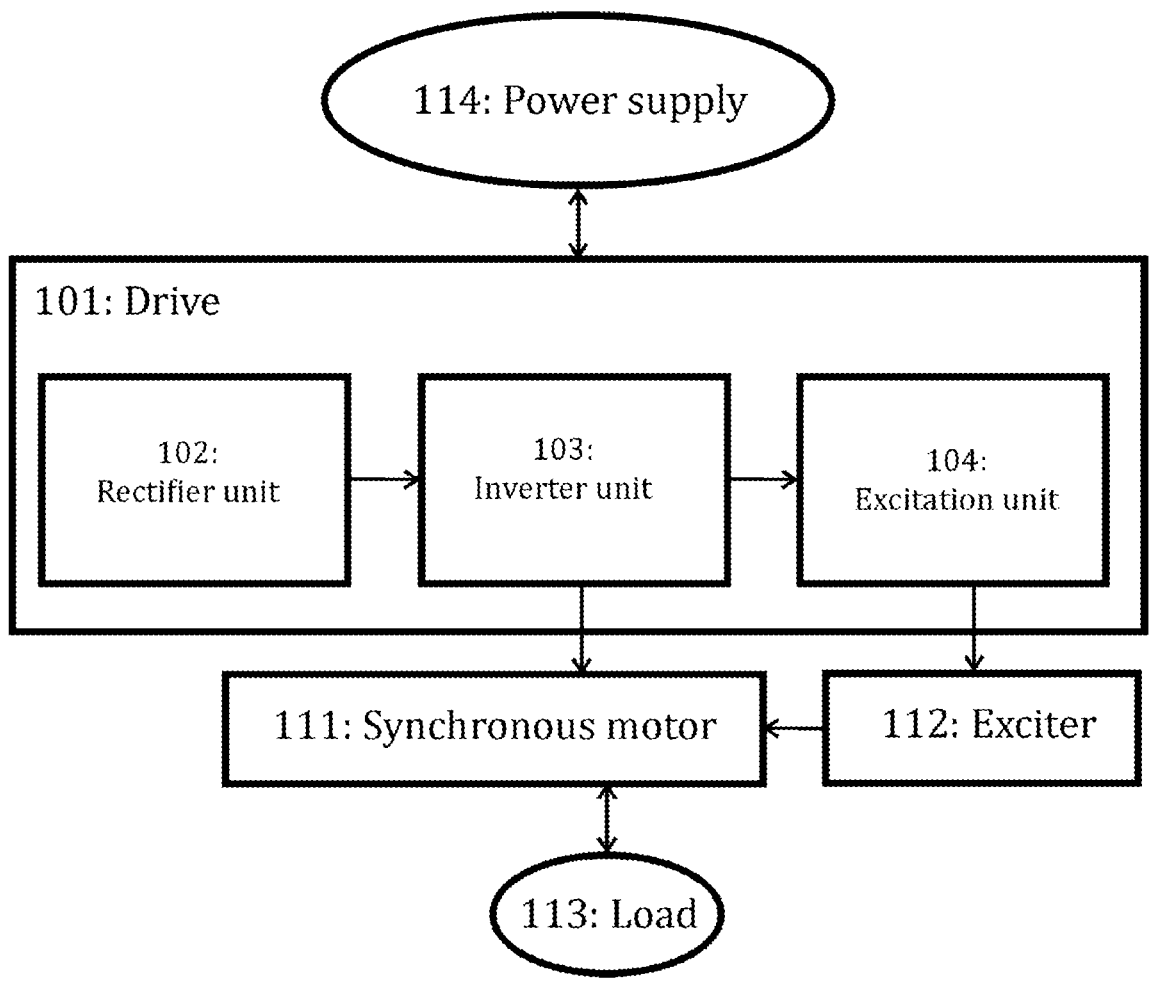
FIG. 1A illustrates an exemplary industrial system according to an embodiment.

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware.

A synchronous motor is an electric motor where the rotation of the motor shaft (i.e., of the rotor) is synchronized with the frequency of the supply current at steady state so that the rotation period is equal to an integral number of alternating current (AC) cycles.

Externally excited (or externally magnetized) synchronous motors are used in a variety of applications in industry, transportation, and utilities sectors. In externally excited synchronous motors, the rotor of the synchronous motor is connected to a DC power source via a rotating electrical contact called a slip ring and conductive brushes. Alternatively, a brushless exciter may be employed for enabling said DC connection.

One common way for controlling externally-excited synchronous motors is the so-called vector control where the torque of the machine is controlled by controlling a stator current and/or voltage vector. The stator current/voltage vector is a vector comprising two orthogonal stator current/voltage components derived from stator currents/voltages of a three-phase AC electric machine. One of said components defines the magnetic flux of the motor, the other the torque of the motor. These stator current/voltage components may be written either in a stationary reference frame as α- and β-axis stator currents/voltages or in a moving reference frame (moving in sync with the rotor) as d- and q-axis stator currents/voltages, respectively. The actual control in the vector control is typically performed for the d- and q-axis stator currents or voltages while the α- and β-axis stator currents or voltages are used for actually driving the synchronous motor. The d- and q-axis currents/voltages may be converted to the α- and β-axis currents/voltages using inverse Park transform while an opposite transformation is possible using Park transform.

In conventional direct flux linkage control (DFLC), current vector control is ideally not used at all though, in practice, this is not feasible. The transistor switches cause nonlinearly current dependent voltage drops. The power switches require a certain time to switch on or off, and during that time the voltage is difficult to estimate. The resistive voltage drop in the motor cable and in the stator winding causes further uncertainty. The voltage model is based on the integration (see equation (22)), and errors are integrated, too. Even with quite accurate estimates for all these voltage drops the pure voltage integral based estimate is erroneous. The DFLC method keeps the stator flux linkage estimate origin centered. If it contains a cumulative error, the real motor stator flux linkage drifts erroneously.

One particular type of vector control for overcoming the problems mentioned in the previous paragraph is the so-called Direct Torque Control (DTC). DTC corresponds to an advanced form of DFLC where the stator flux linkage of the synchronous motor is directly controlled with the stator voltage vector, as in conventional DFLC, while also employing a current model which keeps the stator flux linkage estimate accurate also at low frequencies (i.e., employing current feedback correction). The current model may be specifically based on measured stator currents and motor inductance parameters (see equation (23)). The torque of the synchronous motor can be changed by accelerating rotational speed of the stator flux linkage vector.

Thus, for optimal performance using DTC, the excitation current of the field winding must be controlled based, e.g., on the motor model parameters and load. Many different control schemes are known for calculating and controlling the excitation current reference (i.e., the desired value of the excitation current). For example, the so-called unity power factor control (i.e., a control scheme where the aim is to maintain the power factor in a steady state at one) is advantageous for the static performance, since the stator current can then be fully utilized for the torque production.

The field weakening range is an angular speed range above the field weakening point (i.e., a particular angular speed corresponding to nominal stator flux linkage and maximum available voltage). The rotating speed cannot be increased above the field weakening point without decreasing the stator flux linkage modulus (i.e., absolute value of the stator flux linkage). Especially in said field weakening range, the drive stability is heavily dependent on the excitation control. Unlike most traditional vector control methods conventional DTC cannot directly adjust the stator flux linkage load angle but it is formed freely, according to the load and the magnetic state of the synchronous motor.

In certain demanding synchronous motor applications, for example, in the metals industry, long field weakening range and/or short-time overloading of the (externally excited) synchronous motor are typical. With the traditional unity power factor DTC control, the stator flux linkage load angle has a high value in the aforementioned operation points and thus the desired torque requirements cannot typically be reached.

The embodiments to be discussed below in detail seek to overcome the aforementioned problems encountered in said more demanding externally-excited synchronous motor applications. Specifically, some of the embodiments provide a control scheme with three distinct operating modes: a conventional or default (unity power factor) operating mode, a stator flux assistance operating mode and an overexcitation operating mode, where the switching between the three operating modes is based on the current stator flux linkage load angle reference and the current stator flux linkage reference.

FIG. 1A illustrates a system to which embodiments of the invention may be applied. FIG. 1A illustrates simplified system architecture only showing some elements and functional entities (namely, showing only some excitation control related elements and functional entities), all being logical units whose implementation may differ from what is shown. The connections shown in FIG. 1A are logical connections; the actual physical connections may be different. It is apparent to a person skilled in the art that the system may also comprise other functions and structures.

FIG. 1A illustrates a system comprising a drive 101 (equally called a motor drive) controlling a synchronous motor 111. The drive 101 is powered by a power supply 114. The synchronous motor 111 may be specifically an externally excited synchronous motor 111 with the external excitation being provided by the exciter 112 (e.g., a slip ring with conductive brushes or a brushless exciter) which is controlled or driven by the drive 101 (or specifically by the excitation unit 104 therein). The illustrated system (or specifically the drive 101) may be configured to operate using direct torque control (DTC), current vector control or any other control scheme enabling satisfying of stator flux linkage and torque references. The synchronous motor 111 may be a salient pole motor (equally called a salient motor) or a non-salient pole motor (equally called a non-salient motor).

The synchronous motor 111 is connected to a mechanical load 113. The mechanical load 113 may correspond, for example, to a device or a system for transporting material, such as a pump, a fan, a compressor, a blower, a conveyor belt, a crane and/or an elevator and/or a device or a system for processing materials, such as a paper machine, a mill, a stirrer and/or a centrifuge.

The drive 101 is a device used for controlling the motion of the synchronous motor 111 (or a synchronous machine). Said control may be achieved by changing one or more drive parameters of the drive 101 which may comprise parameters such as torque, speed, power, voltage, excitation current, stator flux, stator flux linkage, frequency, motor control mode (e.g., scalar, vector or direct torque control), proportional-integral-derivative (PID) controller settings, acceleration ramp settings, deceleration ramp settings and/or other parameters affecting the operation of the drive. The drive 101 may specifically be an electrical drive (an AC drive supporting low to high voltages and/or low to high motor speeds). The drive 101 may be equally called a frequency converter. The drive 101 may be a programmable logic controller (PLC) or a (motor) soft starter. In an embodiment, the drive 101 may be a variable speed drive (VSD) or a variable frequency drive (VFD). The drive 100 (or specifically the inverter unit 103) feeds the synchronous motor 111 via a three-phase power supply. Contrary to some definitions of term "drive", the synchronous motor 111 which is driven by the drive 101 does not form a part of the drive 101 itself in the context of this application (as is also shown in FIG. 1A).

The drive 101 comprises a rectifier unit 102 for connecting to the alternating current (AC) power supply 114 and converting the AC power to DC power.

Moreover, the drive 101 comprises an inverter unit 103 for converting the DC power provided by the inverter unit 103 to AC power for driving the synchronous motor 111 in a controlled manner. Specifically, the inverter unit 103 is configured to feed the stator winding of the synchronous motor 111 to control the operation of the synchronous motor 111 (e.g., the air gap torque and the stator flux). In other words, the inverter unit 103 is configured to provide stator voltage signals having a particular voltage and frequency to the synchronous motor 111. As described above, the control of the synchronous motor 111 may be provided using, e.g., DTC or current vector control though additional operating modes according to embodiments may be implemented, as will be described below in detail.

The rectifier and inverter units 102, 103 may be connected together via a direct current (DC) circuit (equally called a DC link) comprising at least one DC choke (not shown in FIG. 1A).

Additionally, the drive 101 comprises an excitation unit for providing an external DC excitation for a rotor of the synchronous machine 111 (i.e., for an excitation winding of the synchronous machine 111). The external excitation may be provided to the excitation winding via an exciter 112 such as a rotary electrical contact (also called a split ring or an electrical slip ring). The excitation unit 104 may be configured to be controlled by the inverter unit 103. For example, the inverter unit 103 may be configured to calculate an excitation winding current that would produce unity power factor (or other desired power factor) in the steady state and to provide the calculated value as an excitation (or field) current reference to the excitation unit 104.

The drive 101 may further comprise one or more user input devices (e.g., a control panel or a touch screen) for enabling the user to control the operation of the drive 101.

The drive 101 may be configured to monitor one or more drive parameters of the drive 101 and/or one or more motor parameters of the synchronous motor 111. The drive 101 may monitor at least values of the stator flux linkage reference, the torque reference the stator flux linkage load angle reference. More generally, the drive 101 may monitor values of at least two of the stator flux linkage reference, the stator flux linkage load angle reference, and the torque reference (the third quantity being derivable based on the other two, as will be shown below). In some embodiments, at least the stator flux linkage and torque references may be monitored.

While FIG. 1A illustrates a single synchronous motor 111, in other embodiments the drive 101 may be used for controlling an electrical machine comprising multiple synchronous motors or machines.

Figure 1B:
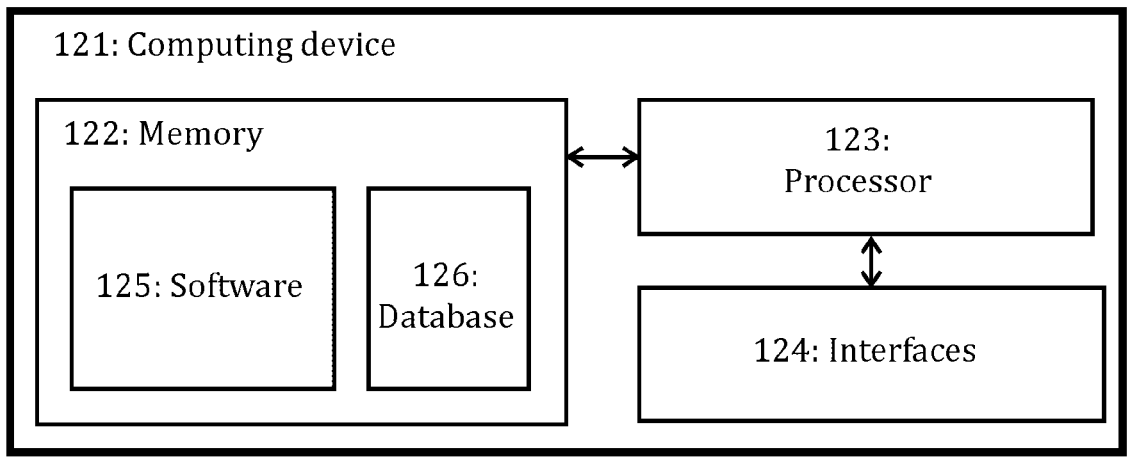
FIG. 1B illustrates a computing device for a drive of the exemplary industrial system of FIG. 1A according to an embodiment.

FIG. 1B illustrates a computing device 121 which may form a part of the drive 101 of FIG. 1A. Specifically, the computing device 121 may form a part of the inverter unit 103 of the drive 101 or may be at least communicatively connected to it. The computing device may be configured to cause the operation of the inverter unit 103, that is, to control the synchronous motor by controlling the voltage and frequency supplied to the stator windings of the synchronous motor 111 and by also controlling the operation of the excitation unit 104.

The computing device 121 comprises a processor 123, interfaces 124 and a memory 122. The processor 123 may be a central processing unit (CPU) of the drive 101. In some embodiments, one or more control circuitry such as one or more processors may be provided in the computing device 121, instead of a singular processor 123. According to embodiments, the computing device 121 may comprise one or more control circuitry 123, such as at least one processor, and at least one memory 122, including one or more algorithms 125, such as a computer program code (software), wherein the at least one memory and the computer program code (software) are configured, with the at least one processor, to cause the computing device to carry out any one of the exemplified functionalities of the computing device or the drive to be described below. It is also feasible to use specific integrated circuits, such as ASIC (Application Specific Integrated Circuit) or other components and devices for implementing the functionalities in accordance with different embodiments.

The memory 122 of the computing device 121 may be implemented using any suitable data storage technology, such as semiconductor-based memory devices, flash memory, magnetic memory devices and systems, optical memory devices and systems, fixed memory and removable memory. The memory 122 comprises at least one database 126 and software 125 (i.e., one or more algorithms).

The interfaces 124 of the computing device 121 may comprise, for example, one or more communication interfaces comprising hardware and/or software for realizing communication connectivity according to one or more communication protocols. Specifically, the one or more communication interfaces 124 may comprise, for example, at least one interface providing a connection to an excitation unit. The one or more communication interfaces 104 may comprise standard well-known components such as an amplifier, filter, frequency-converter, (de)modulator, and encoder/decoder circuitries, controlled by the corresponding controlling units, and one or more antennas. The one or more communication interfaces 124 may also comprise a user interface.

Figure 2:
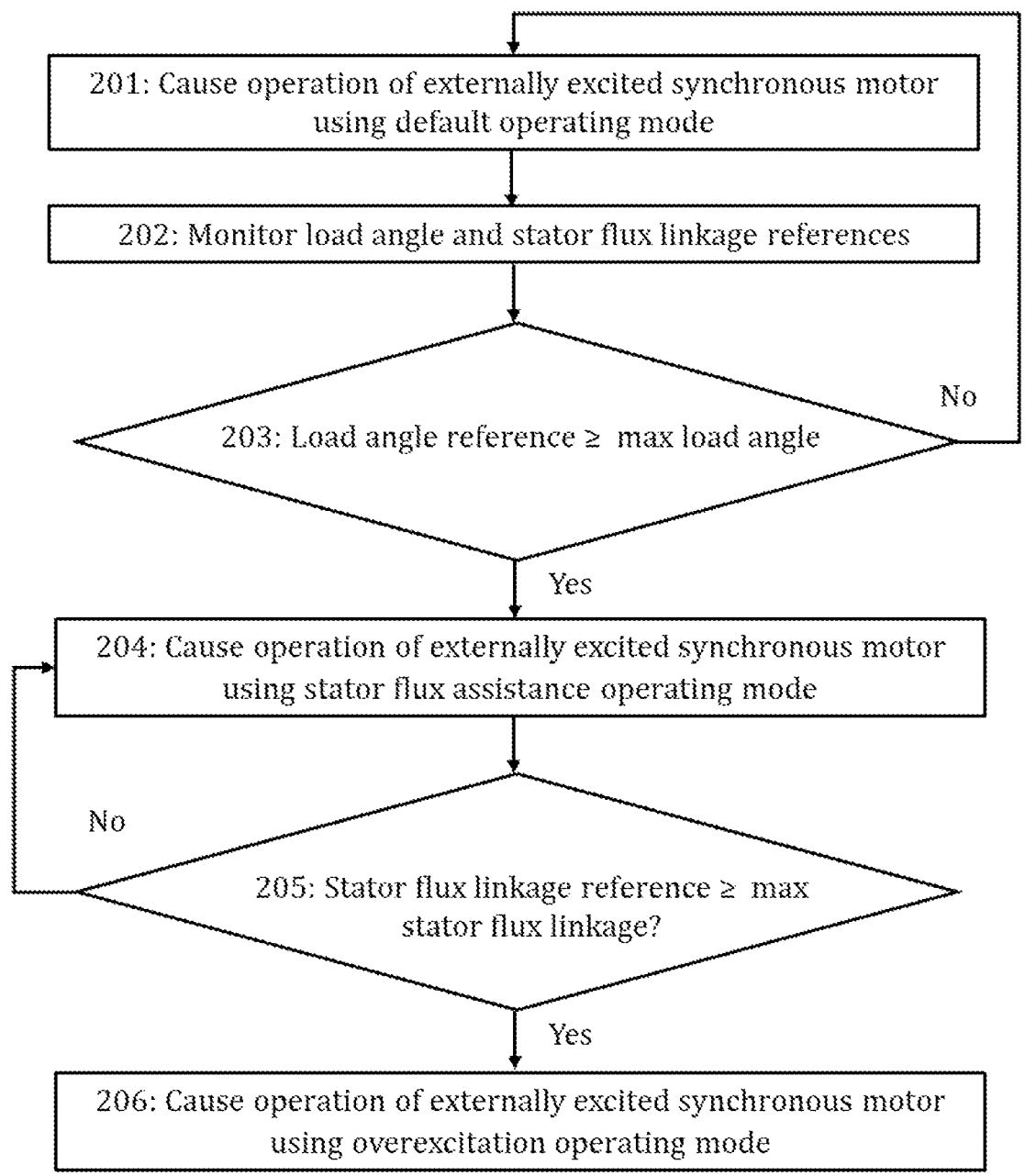
FIGS. 2 to 3 illustrate exemplary processes according to embodiments.

FIG. 2 illustrates a process according to embodiments for control of an externally excited synchronous motor. The process may be carried out by the drive 101 of FIG. 1A (e.g., by the inverter unit 103 therein) or specifically by the computing device 121 of FIG. 1B comprised in the drive 101 (in the inverter unit 103 or communicatively connected thereto). Specifically, at least one processor of the computing device of the drive and at least one memory of the computing device of the drive for storing instructions to be executed by the at least one processor may be configured so as to cause the drive to carry out the illustrated process. In the following discussion, the actor of the process is called "the drive" without loss of generality.

Referring to FIG. 2, the drive causes, in block 201, operation of the externally excited synchronous motor using, e.g., DTC, current vector control or other control scheme enabling satisfying stator flux linkage and torque references. Specifically, the operation in block 201 may correspond to operating the drive using a primary (or normal or conventional) operating mode of the drive. This primary operating mode may correspond to unity power factor operation. In other words, in the primary operating mode of the drive, a minimum of a nominal stator flux linkage and a pre-defined maximum allowed stator flux linkage (for steady state operation) is used a stator flux linkage reference and an excitation current for providing unity power factor operation in a steady state is used as an excitation current reference. Thus, the following equation holds:

$$\psi_{s,ref} = \min(\psi_{s,nom}, \psi_{s,max}) \tag{1}$$

where $\psi_{s,ref}$ is the stator flux linkage reference, $\psi_{s,nom}$ is the nominal stator flux linkage and $\psi_{s,max}$ is the pre-defined maximum allowed stator flux linkage for steady state operation. According to a common definition, the power factor is the ratio of the real power absorbed by the load connected to the synchronous motor to the apparent power fed to the synchronous motor, and is a dimensionless number in the closed interval of −1 to 1.

In some embodiments, the pre-defined maximum allowed stator flux linkage may correspond to an upper limit of a linear modulation range for the inverter unit of the drive.

The standard per unit system may be used in the control. The standard per unit system may be used throughout this application (that is, in all of the following equations). Omitting the stator resistance, the nominal stator flux may be defined as $\psi_{s,nom} = n$ p.u. where n is a real number (e.g., 1).

The pre-defined maximum allowed stator flux linkage (magnitude) $\psi_{s,max}$ may be defined as $$\psi_{s,max} = \frac{u_{DC}}{\sqrt{3}\,\omega_s}, \qquad (2)$$

where $u_{DC}$ is a DC link voltage of the drive and $\omega_s$ is a stator angular frequency. This corresponds to the upper limit of the linear modulation range for a three-phase two-level inverter.

As mentioned above, in the steady state operation in the primary operating mode, the excitation current reference (magnitude) $i_{r,upf}$ that gives unity power factor is calculated and used. Said excitation current for providing unity power factor operation in the steady state may be calculated, e.g., based at least on the stator flux linkage reference and the torque reference (monitored in block 202), as will be discussed below in detail.

The excitation current for providing unity power factor operation in the steady state may be calculated using the following equation:

$$i_{f,upf} = \frac{\psi_{s,ref}^2 + L_{sd}L_{sq}i_s^2}{L_{md}\sqrt{\psi_{s,ref}^2 + L_{sq}^2 i_s^2}}, \qquad (3)$$

where $\psi_{s,ref}$ the stator flux linkage reference (magnitude), $L_{sd}$ is a d-axis stator inductance, $L_{sq}$ is a q-axis stator inductance, $L_{md}$ is a d-axis magnetizing inductance and $i_s$ is a stator current (magnitude). The per unit system as described above is used also here.

As the stator current $i_s$ can contain ripple, a more stable way for evaluating $i_s$ in the case of unity power factor is to use the following approximation:

$$i_s \approx \frac{T_{e,ref}}{\psi_{s,ref}}, \qquad (4)$$

where $T_{e,ref}$ is the torque reference (magnitude) and $\psi_{s,ref}$ is the stator flux linkage reference (magnitude). Use of this approximation also improves the response as the excitation current reference is calculated based on references rather than based on the corresponding actual values. Combining the equations (3) & (4), the excitation current providing unity power factor operation in steady state $i_{r,upf}$ may be calculated by the drive (or specifically by the inverter unit or the computing device therein) according to $$i_{f,upf} = \frac{\psi_{s,ref}^2 + L_{sd}L_{sq}\frac{T_{e,ref}^2}{\psi_{s,ref}^2}}{L_{md}\sqrt{\psi_{s,ref}^2 + L_{sq}^2\frac{T_{e,ref}^2}{\psi_{s,ref}^2}}}. \qquad (5)$$

Assuming that the synchronous motor is a non-salient pole motor (and thus $L_{sd}=L_{sq}=L_s$ and $L_{md}=L_{mq}=L_m$), the previous equation can be further simplified to $$i_{f,upf} = \frac{\sqrt{\psi_{s,ref}^2 + L_s^2\frac{T_{e,ref}^2}{\psi_{s,ref}^2}}}{L_m}. \qquad (6)$$

Thus, at least the torque reference $T_{e,ref}$ and the stator flux linkage reference $\psi_{s,ref}$ need to be monitored for enabling the unity power factor operation.

The primary operating mode of the drive as described above in connection with block 201 is used by the drive under normal non-demanding circumstances, that is, when the stator flux linkage load angle reference $\delta_{upf}$ (defined by the drive) for unity power factor operation is below a maximum desired stator flux linkage load angle $\delta_{max}$. The stator flux linkage load angle $\delta$ (equally called simply the load angle) is the angle between the rotor axis (or equally the d-axis of a dq coordinate system) and the stator flux linkage vector $\psi_s$. The stator flux linkage load angle reference $\delta_{upf}$ corresponds to a desired value for the stator flux linkage load angle (i.e., a value which the drive seeks to implement) for achieving unity power factor. The value of the stator flux linkage load angle reference $\delta_{upf}$ may be derivable based on the torque reference and the stator flux linkage reference. Specifically, the stator flux linkage load angle reference $\delta_{upf}$ may be calculated for salient pole motors as $$\tan(\delta_{upf}) = \frac{L_{sq}T_{e,ref}}{\psi_{s,ref}^2} \qquad (7)$$

and for non-salient pole motors as $$\tan(\delta_{upf}) = \frac{L_s T_{e,ref}}{\psi_{s,ref}^2}. \qquad (8)$$

Synchronous motors have, in principle, a stable working area approximately within the load angle $\delta$ between $-\pi/2\ldots\pi/2$. According to the basic theory of DTC, the angular acceleration of the stator flux linkage vector $\psi_s$ is assumed to increase with the torque in all cases. Conventional DTC does not recognize the unstable working area, but tries to accelerate the stator flux linkage vector $\psi_s$ as long as the actual value is smaller than the torque reference. It is thus obvious, that conventional DTC causes a very fast torque breakdown for the synchronous machine, if the load angle leaves the stable working area.

Stator flux/excitation current control enabling stable operation is desired even when the stator flux linkage load angle reaches the maximum. To enable this, two further operating modes, in addition to the conventional (e.g., DTC) operating mode, may be defined for the drive.

To enable switching between the different operating modes and operation using said operating modes, the drive monitors, in block 202, at least stator flux linkage load angle and stator flux linkage references (and a torque reference) used by the drive (i.e., defined for control of the externally excited synchronous motor by the drive), as defined above. The monitoring in block 202 may be carried out when driving the externally excited synchronous motor (using any operating mode of the drive). The drive may monitor at least two of said references directly. As is clear from equations (7) and (8), the third reference is derivable based on the other two references (i.e., it may be monitored indirectly based on the other two references). Specifically, the stator flux linkage load angle reference and the stator flux linkage reference may be usable for switching between the different operating modes while the stator flux linkage reference and the torque reference may be used for enabling the operation using the different operating modes.

The drive may continue to operate using the default operating mode in block 201 as long as the stator flux linkage load angle reference for steady state operation is smaller than the pre-defined maximum allowed stator flux linkage load angle (i.e., $\delta_{upf} < \delta_{max}$) in block 203. It may also be assumed that the stator flux linkage reference remains smaller than the pre-defined maximum allowed stator flux linkage (i.e., $\psi_{s,ref} \leq \psi_{s,max}$) during this time. This operation is illustrated in FIG. 2 by the arrow connecting block 203 (no) back to block 201.

In response to the stator flux linkage load angle reference (for steady state operation) reaching or exceeding a pre-defined maximum allowed stator flux linkage load angle for steady state operation (i.e., $\psi_{upf} \geq \delta_{max}$) in block 203 (while the stator flux linkage reference (magnitude) is below the pre-defined maximum allowed stator flux linkage, i.e., $\psi_{s,ref} < \psi_{s,max}$), the drive operates (or starts operating), in block 204, in a stator flux assistance operating mode. In the stator flux assistance operating mode, an increased stator flux linkage for allowing operation with the pre-defined maximum allowed stator flux linkage load angle (in steady state) with unity power factor (or, in some embodiments, at least maximized sub-unity power factor if unity power factor is not achievable) is used as the stator flux linkage reference. Said increased stator flux linkage is increased specifically relative to a stator flux linkage usable in the primary operating mode as the stator flux linkage reference. Said increased stator flux linkage may be defined to be larger than the nominal stator flux linkage and/or smaller than the pre-defined maximum allowed stator flux linkage. The increased stator flux linkage may be calculated at least based on the torque reference and the pre-defined maximum allowed stator flux linkage load angle. Further, the excitation current of the primary operating mode (as defined above) is used as the excitation current reference.

As indicated above, the stator flux linkage load angle reference and the pre-defined maximum allowed stator flux linkage load angle $\delta_{max}$ are defined specifically for steady state operation. Thus, the instantaneous stator flux linkage load angle reference may be allowed to exceed $\delta_{max}$ momentarily.

The pre-defined maximum allowed stator flux linkage load angle $\delta_{max}$ for steady state operation may be defined to be at least larger than 0° and smaller than 90°. In some embodiments, the pre-defined maximum allowed stator flux linkage load angle $\delta_{max}$ for steady state operation may be defined to be smaller than 80° or 70°. Additionally, or alternatively, the pre-defined maximum allowed stator flux linkage load angle $\delta_{max}$ for steady state operation may be defined to be larger than 40° or 50°.

In the following, an equation for said increased stator flux linkage for unity power factor operation to be used as stator flux linkage reference is derived. With unity power factor control in the steady state (where stator flux linkage and stator current vectors are perpendicular to each other), the tangent of the stator flux linkage load angle satisfies the following equation:

$$\tan(\delta) = L_{sq} \frac{i_s}{\psi_s} \approx L_{sq} \frac{T_{e,ref}}{\psi_s^2}. \tag{9}$$

The stator flux linkage reference $\psi_{s,ref}$ for the unity power factor can then be obtained as $$\psi_{s,ref} = \sqrt{\frac{L_{sq} T_{e,ref}}{\tan(\delta)}}. \tag{10}$$

The aim of the stator flux assistance operating mode of the drive is to limit the stator flux linkage load angle reference (and thus also the stator flux linkage load angle) to some reasonable value (i.e., to $\delta_{max}$) in the steady state. This can be achieved by calculating a new stator flux linkage reference using the previous equation (10) by inserting the torque reference, the q-axis stator inductance and the pre-defined maximum allowed load angle $\delta_{max}$. In other words, said increased stator flux linkage (magnitude) $\psi_{s,ass}$ for use as the stator flux linkage reference in the stator flux assistance operating mode may be calculated according to $$\psi_{s,ass} = \sqrt{\frac{L_{sq} T_{e,ref}}{\tan(\delta_{max})}}. \tag{11}$$

The equation (9) applies for salient pole motors and non-salient pole motors. As mentioned above, for non-salient pole motors, $L_{sq} = L_{sd} = L_s$ holds and thus the equation (9) may be written for non-salient pole motors as $$\psi_{s,ass} = \sqrt{\frac{L_s T_{e,ref}}{\tan(\delta_{max})}}. \tag{12}$$

The calculated stator flux linkage reference (magnitude) may be later limited to the field-weakening maximum flux linkage (magnitude) $\psi_{s,fwmax}$ according to $$\psi_s = \min(\psi_{s,ref}, \psi_{s,fwmax}). \tag{13}$$

Thus, the stator flux assistance operating mode may be applicable in the demanding applications where the operating point is not in the field weakening range. An example of such an operation point is when the motor is fully loaded with 200% to 225% load where the speed is 0.5 p.u. Such operating points are common, e.g., in the metal industry where the roller is loaded with a metal sheet and the speed is below 1 p.u.

In some embodiments, the stator flux assistance operating mode may comprise two submodes: stator flux assistance as described above and stator flux assistance with limited excitation. These submodes are triggered depending on the value of the excitation current, as will be discussed in detail in connection with FIG. 3.

The drive may continue to operate using the stator flux assistance operating mode in block 204 as long as the stator flux linkage reference remains smaller than the pre-defined maximum allowed stator flux linkage (i.e., $\psi_{s,ref} \leq \psi_{s,max}$) in block 205. This is illustrated in FIG. 2 by the arrow connecting block 205 (no) back to block 204. While not explicitly shown in FIG. 2, in some embodiments, the drive may also be able to move from the stator flux assistance operating mode back to the default operating mode if the condition of block 203 is no longer satisfied.

In response to the stator flux linkage reference being equal to the pre-defined maximum allowed stator flux linkage (i.e., $\psi_{s,ref} = \psi_{s,max}$) in block 205 (while the stator flux linkage load angle reference for steady state operation is still equal to or exceeds the pre-defined maximum allowed stator flux linkage load angle, i.e., $\delta_{upf} = \delta_{max}$, the drive operates (or starts operating), in block 206, in an overexcitation operating mode. In the overexcitation operating mode, the pre-defined maximum allowed stator flux linkage is used as the stator flux linkage reference. Further, an increased excitation current is used as the excitation current reference. The term "increased" in "increased excitation current" refers specifically to an increase relative to an excitation current used (or usable) in the stator flux assistance operating mode and/or relative to an excitation current providing unity power factor (corresponding, e.g., to operation in the default operating mode). Said increased excitation current is specifically configured to allow operation with the pre-defined maximum allowed stator flux linkage and the pre-defined maximum allowed stator flux linkage load angle with a maximized (though sub-unity) power factor (that is, a power factor smaller than unity). During operation in the overexcitation operating mode, the load angle (reference) is at maximum desired stator flux linkage load angle regardless of torque, and the power factor decreases as function of torque.

With typical unsaturated q-axis synchronous inductance, for example 1.0 p.u., and when operating with 200% speed and 200% power, i.e., with approximately 0.5 p.u. stator flux linkage amplitude, and 2.0 p.u. stator current amplitude, almost 76° load angle is reached with unity power factor control in the steady state in this example case. In theory, up to 90° load angles are feasible in the steady state with non-salient pole synchronous motors. In practice, however, due to motor model parameter errors, high load angles may be problematic. Thus, there is a need for the overexcitation operating mode in most practical scenarios.

In the following, an equation for said increased excitation current to be used for excitation current reference is derived. The steady state torque $T_e$ can be expressed as function of the stator flux linkage $\psi_e$ (or stator flux linkage amplitude), the load angle $\delta$ and the excitation current $I_f$ as $$T_e = \left[\frac{L_{md}}{L_{sd}}i_f + \left(\frac{1}{L_{sq}} - \frac{1}{L_{sd}}\right)\psi_s\cos(\delta)\right]\psi_s\sin(\delta). \quad (14)$$

Based on (14), the excitation current $i_f$ can be expressed as function of the stator flux linkage $\psi_{s,ref}$, the load angle $\delta$ and the torque $T_e$ as $$i_f = \frac{L_{sd}L_{sq}T_e - (L_{sd} - L_{sq})\psi_s^2\sin(\delta)\cos(\delta)}{L_{md}L_{sq}\psi_s\sin(\delta)}. \quad (15)$$

Then, a minimum limit for the excitation current reference may be calculated by inserting the torque reference $T_{e,ref}$, the stator flux linkage reference $\psi_{s,ref}$ (which is here equal to the pre-defined maximum allowed stator flux linkage $\psi_{s,max}$) and the pre-defined desired maximum load angle $\delta_{max}$ to (15). In other words, the excitation current reference (magnitude) $i_{f,oex}$ (or specifically minimum limit thereof) for use in the overexcitation mode may be calculated (by the drive) as $$i_{f,oex} = \frac{L_{sd}L_{sq}T_{e,ref} - (L_{sd} - L_{sq})\psi_{s,ref}^2\sin(\delta_{max})\cos(\delta_{max})}{L_{md}L_{sq}\psi_{s,ref}\sin(\delta_{max})}. \quad (16)$$

Increasing the excitation current reference minimum limit is a suitable solution for the field-weakening where the voltage is limited and consequently, the stator flux linkage cannot be increased.

Assuming that the synchronous motor is a non-salient pole motor (and thus $L_{sd}=L_{sq}=L_s$ & $L_{md}=L_{mq}=L_m$), the equation (16) can be further simplified to $$i_{f,oex} = \frac{L_s T_{e,ref}}{L_m \psi_{s,ref}\sin(\delta_{max})}. \quad (17)$$

It should be noted that, based on (17), an inverse correlation exists between the stator flux linkage and the excitation current for the non-salient pole motors. Therefore, increasing the stator flux linkage always reduces the excitation current for the non-salient pole motors. However, due to saturation, $L_m$ decreases as a function of the stator flux linkage. Thus, the correlation may not be strictly inverse.

While not explicitly shown in FIG. 2, in some embodiments, the drive may also be able to move from the overexcitation operating mode back to the stator flux assistance operating mode if the pre-defined criteria of block 205 are no longer satisfied.

It should be noted that the combination of the stator flux assistance and the overexcitation operating modes leads to a dynamic control for demanding applications. The torque requirements can be fulfilled either with the excitation current or the q-axis component of the stator current. The stator flux assistance operating mode keeps the unity power factor and reduces the stator current. In addition, the stator flux assistance leads to a lower excitation current for the non-salient pole synchronous motors. Thus, it is beneficial to use the stator flux assistance to fulfill the torque requirements where the operation point is not in the field-weakening. In the field-weakening, the high torque requirements can be fulfilled using the overexcitation.

In some alternative embodiments, only one of the stator flux assistance and overexcitation operating modes may be implemented in the drive.

Figure 3:
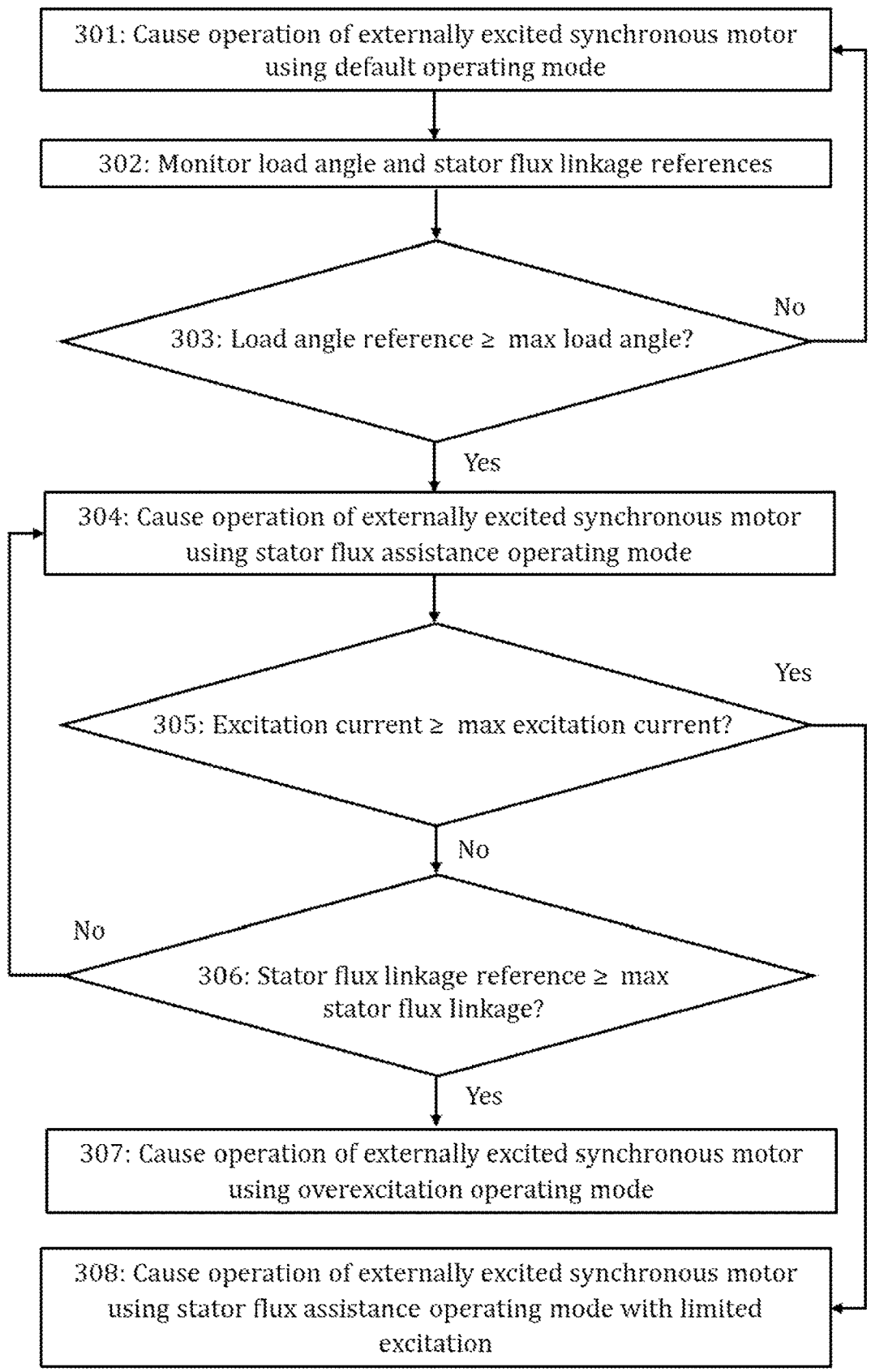

FIG. 3 illustrates another process according to embodiments for control of an externally excited synchronous motor. The process may be carried out by the drive 101 of FIG. 1A (e.g., by the inverter unit 103 therein) or specifically by the computing device 121 of FIG. 1B comprised in the drive 101 (in the inverter unit 103 or communicatively connected thereto). Specifically, at least one processor of the computing device of the drive and at least one memory of the computing device of the drive for storing instructions to be executed by the at least one processor may be configured so as to cause the drive to carry out the illustrated process. In the following discussion, the actor of the process is called "the drive" without loss of generality.

The process of FIG. 3 corresponds, to a large extent, to the process of FIG. 2. The differences of FIG. 3 compared to FIG. 2 (namely, blocks 305, 308) serve to illustrate the operation of the stator flux assistance operating mode according to an embodiment in further detail. The operation pertaining to the other two operating modes of the drive may be carried out as described in connection with FIG. 2.

Referring to FIG. 3, the initial steps of the process relating to blocks 301, 302 may correspond fully to blocks 201, 202 of FIG. 2, respectively.

In response to the stator flux linkage load angle reference for steady state operation reaching (or exceeding) a pre-defined maximum allowed stator flux linkage load angle for steady state operation (i.e., $\delta_{upf} \geq \delta_{max}$) in block 303 (while the stator flux linkage reference (magnitude) is below the pre-defined maximum allowed stator flux linkage, i.e., $\psi_{s,ref} < \psi_{s,max}$), the drive operates, in block 304, in a stator flux assistance operating mode (with unity power factor). In the stator flux assistance operating mode, an increased stator flux linkage (compared to the primary operating mode of the drive) for allowing operation with the pre-defined maximum allowed stator flux linkage load angle with unity power factor is used as the stator flux linkage reference. Said increased stator flux linkage is defined to be between the nominal and the maximum stator fluxes. Further, the excitation current of the primary operating mode of the drive (as defined above) is used as the excitation current reference.

As described in connection with block 203, said increased stator flux linkage for use as the stator flux linkage reference in the stator flux assistance operating mode may be calculated based at least on a torque reference and the pre-defined maximum allowed stator flux linkage load angle (and the stator inductance). Specifically, the increased stator flux linkage may be calculated, in this case, according to (11). Further, during the operation in the stator flux assistance operating mode with unity power factor in block 304, the drive may calculate the used excitation current reference $i_{f,upf}$ using (5) or (6). However, equations (5) and (6) are applicable only when unity power factor can be achieved. If the excitation current (reference) needs to be limited to a relatively low value, for example, due to thermal protection of the windings, unity power factor may not be achievable as the load is increasing. To overcome this limitation, the drive may monitor the value of the excitation current and, if a pre-defined maximum excitation current is reached, modify the calculation of the increased stator flux linkage $\psi_{s,ass}$ to take into account the fact that the value of the excitation current reference can no longer be increased.

Namely, in response to the excitation current $I_{f,upf}$ for providing the unity power factor operation being calculated to be larger than or equal to a pre-defined maximum excitation current $I_{f,max}$ in block 305, the drive calculates, in block 308, the increased stator flux linkage $\psi_{s,ass}$ for allowing operation with maximized but sub-unity power factor and with the pre-defined maximum allowed stator flux linkage load angle based at least on the torque reference, the pre-defined maximum allowed stator flux linkage load angle and the pre-defined maximum excitation current (and the stator and magnetizing inductances). Specifically, the increased stator flux linkage (magnitude) $\psi_{s,ass}$ may be calculated, in this case, according to $$\psi_{s,ass} = \frac{-B + \sqrt{B^2 - 4AC}}{2A}, \quad (18)$$

where $A=(L_{sd}-L_{sq})\sin(\delta_{max})\cos(\delta_{max})$, $B=L_{md}L_{sq}i_{f,max}\sin(\delta_{max})$ and $C=-L_{sd}L_{sq}T_{e,ref}$ (the quantities being defined as described above). This way the stator flux linkage load angle may be kept at the desired maximum value in the steady state. It should be noted that the reference calculated by equation (18) has the absolute maximum limit of $\psi_{s,max}$ (and a minimum of $\psi_{s,nom}$).

The equation (18) may be written in a simplified form for non-salient pole motors (assuming $L_{sd}=L_{sq}=L_s$ & $L_{md}=L_{mq}=L_m$) as:

$$\psi_{s,ass} = \frac{-C}{B} = \frac{L_s T_{e,ref}}{L_m i_{f,max} \sin(\delta_{max})}. \quad (19)$$

The equation (19) for calculating the increased stator flux linkage $\psi_{s,ass}$ when the excitation current is limited assuming that a non-salient pole motor is used may be derived simply from the electromagnetic torque equation for the synchronous motor. Said electromagnetic torque equation may be written as $$T_{e,ref} = \frac{L_m}{L_s} i_f \psi_s \sin(\delta), \quad (20)$$

where $i_f$ is the excitation current. By reordering (20) and by defining $\psi_s=\psi_{s,ass}$, $i_f=i_{f,max}$ and $\delta=\delta_{max}$, the equation (19) can be derived.

In response to the excitation current $I_{f,upf}$ for providing the unity power factor operation being calculated to be smaller than the pre-defined maximum excitation current $I_{f,max}$ in block 305, the drive further determines, in block 306, whether or not the stator flux linkage reference is equal to (or exceeds) the pre-defined maximum allowed stator flux linkage (while the stator flux linkage load angle reference for steady state operation is still equal to or exceeds the pre-defined maximum allowed stator flux linkage load angle), similar to block 205 of FIG. 2. If the determination in block 306 has a positive result, the drive operates (or starts operating), in block 307, in the overexcitation operating mode, similar to block 206 of FIG. 2. If the determination in block 306 has a negative result, the drive continues operating, in block 304, in the stator flux assistance operating mode (with non-limited excitation).

While not explicitly shown in FIG. 3, the process may also proceed from the stator flux assistance mode with limited excitation (block 308) back to the stator flux assistance mode with non-limited excitation (block 304) if the load decreases (and thus condition in block 305 is no longer satisfied). The process may proceed also from stator flux assistance operating mode with non-limited or limited excitation (blocks 304, 308) to using overexcitation operating mode (block 307) if the condition described in connection block 306 is satisfied. Obviously, the process may proceed also from the overexcitation operating mode to the stator flux assistance operating mode with non-limited or limited excitation (depending on the condition of block 305) if the condition described in connection with block 306 is no longer satisfied.

In some embodiments, the order of blocks 305, 306 in the process may be reversed.

Figure 4:
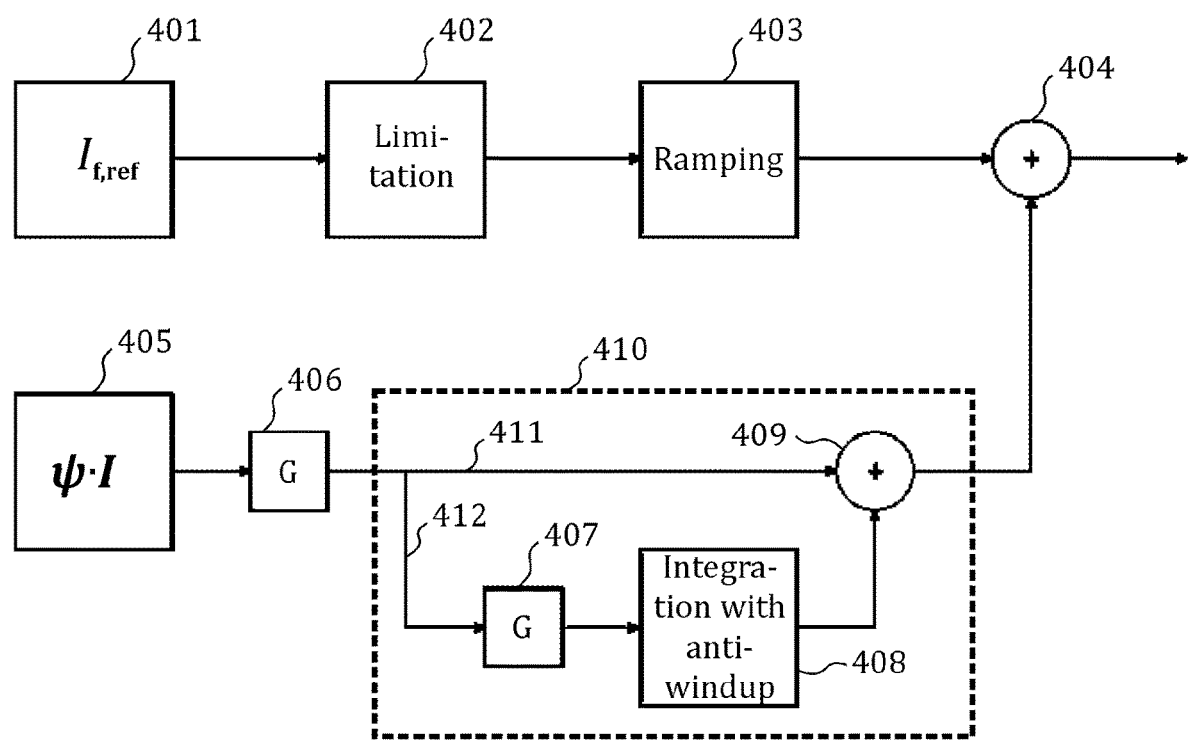
FIG. 4 illustrates an exemplary block diagram of the excitation current reference calculation.

The equations (5) & (6) for calculating the excitation current reference may not, in all circumstances, guarantee a power factor which is equal to one. For example, if there is an error in the motor model parameters (i.e., in any of the parameters $L_{sd}$, $L_{sq}$ and $L_{md}$ for salient pole motor and $L_s$ and $L_m$ for non-salient pole motors), the excitation current reference calculated using (5) & (6) (in the primary and stator flux assistance operating modes of the drive) may lead to a power factor smaller than one. As the voltage model-based stator flux linkage estimate becomes more accurate at higher speeds, a proportional integral (PI)-controller may be used for adjusting the power factor more accurately. FIG. 4 illustrates an exemplary block diagram for enabling calculation of the excitation current reference so that the power factor may be adjusted more accurately. The process may be carried out by the drive 101 of FIG. 1A (e.g., by the inverter unit 103 therein) or specifically by the computing device 121 of FIG. 1B comprised in the drive 101 (in the inverter unit 103 or communicatively connected thereto). Specifically, at least one processor of the computing device of the drive and at least one memory of the computing device of the drive for storing instructions to be executed by the at least one processor may be configured so as to cause the drive to carry out the illustrated process. In the following discussion, the actor of the process is called "the drive" without loss of generality.

Initially, the drive calculates, in block 401, an initial (open-loop) excitation current reference according to (5) or (6) as defined above. This initial excitation current reference may further be limited, in block 402, according to one or more pre-defined limiting parameters (e.g., a threshold defining the maximum level of the excitation current) and/or ramped in block 403 according to one or more pre-defined ramping parameters (e.g., ramp time). Said pre-defined limiting and/or ramping parameters may be defined by the user of the drive (e.g., a user input interface of the drive).

Moreover, the drive calculates, in block 405, a dot product of a stator flux linkage vector $\psi_s$ and an excitation current vector $i_f$ to form an error signal (for the PI-controller 410). In other words, the drive calculates an error signal e according to $$e = \psi_s \cdot i_s = \psi_{sd} I_d + \psi_{sq} I_q \tag{21}$$

where d and q denote d- and q-axis components of the vector quantities. It should be noted that the dot product is zero when the power factor is equal to unity assuming that the resistive voltage loss is neglected, that is, no correction is applied in such an ideal case. At low speeds (i.e., at speeds below a pre-defined speed threshold), a current model-based flux linkage estimate may be used in the dot product calculation in block 405 while, at higher speeds (i.e., at speeds equal to or above the pre-defined speed threshold), the voltage model-based flux linkage estimate may be used instead.

According to a common definition, the voltage model-based flux linkage estimate may be defined as $$\psi_s = \omega_b \int (u_s - i_s R_s) dt, \tag{22}$$

where $\omega_b$ is the angular frequency, $u_s$ is a stator voltage vector, $i_s$ is a stator current vector and $R_s$ is a stator resistance. For salient pole motors, equation (20) may be defined separately for d- and q-axes.

According to a common definition, the current model-based flux linkage estimate may be defined as $$\begin{bmatrix} \psi_{sd} \\ \psi_{sq} \\ \psi_D \\ \psi_Q \\ \psi_f \end{bmatrix} = \begin{bmatrix} L_{sd} & 0 & L_{md} & 0 & L_{md} \\ 0 & L_{sq} & 0 & L_{mq} & 0 \\ L_{md} & 0 & L_D & 0 & L_{fD} \\ 0 & L_{mq} & 0 & L_Q & 0 \\ L_{md} & 0 & L_{fD} & 0 & L_f \end{bmatrix} \begin{bmatrix} i_{sd} \\ i_{sq} \\ i_D \\ i_Q \\ i_f \end{bmatrix}, \tag{23}$$

where $\psi_{sd}$ is a d-axis stator flux linkage component, $\psi_{sq}$ is a q-axis stator flux linkage component, $\psi_D$ is d-axis damper winding flux linkage component, $\psi_Q$ is a q-axis damper winding flux linkage component, $\psi_f$ is a field winding flux linkage component, $L_{sd}$ is a d-axis stator inductance, $L_{md}$ is a d-axis magnetizing inductance, $L_{sq}$ is a q-axis stator inductance, $L_{mq}$ is a q-axis magnetizing inductance, $L_D$ is a d-axis damper winding inductance, $L_Q$ is a q-axis damper winding inductance, $L_f$ is a field winding inductance, $L_{fD}$ is a mutual inductance between the field winding inductance and the d-axis damper winding inductance, $i_d$ is a d-axis stator current component, $i_q$ is a q-axis stator current component, $i_D$ is a d-axis damper winding current, $i_Q$ is a q-axis damper winding current and $i_f$ is a field winding current.

In some embodiments, a gain term may be applied to said error signal, by the drive, in block 406. In other embodiments, block 406 may be omitted.

The drive provides the error signal as an input to a PI-controller 410 to calculate an excitation current correction signal. According to the common definition of a PI-controller, the PI controller 410 comprises a proportional branch 411 and an integral branch 412 which are summed up in a summing element 409. In the illustrated example of the PI controller 410, the proportional branch 411 corresponds to the unmodified error signal while the integral branch comprises a gain element for adding a gain to the error signal and an integration element 408 for integrating the amplified error signal. An anti-windup that limits the integral (I) part of the PI-controller 410 may also be employed in the integration element 408. The properties of the anti-windup function may be definable by the user of the drive.

The gain element 407 may be included equally in the "proportional" (P) branch of the PI-controller 410 or two gain elements may be included, respectively, in the two branches 411, 412 of the PI-controller 410.

Finally, the drive sums, in block 404, the initial excitation current reference and the excitation current correction signal so as to form the (final) excitation current reference (for the exciter). It should be noted that the PI-controller 410 will, in practice, affect the dynamics of the excitation current reference even if there is no error in the motor model parameters and even at low speeds.

The blocks, related functions, and information exchanges described above by means of FIGS. 2 to 4 are in no absolute chronological order, and some of them may be performed simultaneously or in an order differing from the given one. Other functions can also be executed between them or within them, and other information may be sent and/or received, and/or other mapping rules applied. Some of the blocks or part of the blocks or one or more pieces of information can also be left out or replaced by a corresponding block or part of the block or one or more pieces of information.

In an embodiment, at least some of the processes described in connection with FIGS. 2 to 4 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form (processing) means or comprises one or more computer program code portions for carrying out one or more operations according to any one of the embodiments of FIGS. 2 to 4 or operations thereof.

Embodiments as described may also be carried out in the form of a computer process defined by a computer program or portions thereof. Embodiments of the methods described in connection with FIGS. 2 to 4 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a drive for driving an externally excited synchronous motor, the apparatus comprising means for performing:

causing the drive to operate in a primary operating mode for achieving unity power factor;

monitoring at least a stator flux linkage load angle reference, a stator flux linkage reference and a torque reference defined for control of the externally excited synchronous motor by the drive; and in response to the stator flux linkage load angle reference, in a steady state, reaching or exceeding a pre-defined maximum allowed stator flux linkage load angle for steady state operation, causing the drive to operate in a stator flux assistance operating mode, wherein, in the stator flux assistance operating mode, an increased stator flux linkage for allowing operation with the pre-defined maximum allowed stator flux linkage load angle with unity or with at least maximized sub-unity power factor is used as the stator flux linkage reference, the increased stator flux linkage being increased relative to a stator flux linkage usable in the primary operating mode as the stator flux linkage reference; wherein the means are configured to perform during operation in the stator flux assistance operating mode:

calculating the increased stator flux linkage for allowing the operation with the pre-defined maximum allowed stator flux linkage load angle with unity power factor based on the torque reference and the pre-defined maximum allowed stator flux linkage load angle;

and using the calculated increased stator flux linkage for allowing the operation with the pre-defined maximum allowed stator flux linkage load angle with unity power factor as the stator flux linkage reference;

wherein the means are configured to: calculate, during operation in the stator flux assistance operating mode, the increased stator flux linkage for allowing the operation with the pre-defined maximum allowed stator flux linkage load angle with unity power factor $\psi_{s,ass}$, if the externally excited synchronous motor is a salient pole motor, according to:

$$\psi_{s,ass} = \sqrt{\frac{L_{sq}T_{e,ref}}{\tan(\delta_{max})}}$$

or, if the externally excited synchronous motor is a non-salient pole motor, according to $$\psi_{s,ass} = \sqrt{\frac{L_s T_{e,ref}}{\tan(\delta_{max})}},$$

wherein $L_{sq}$ is a q-axis stator inductance, $L_s$ is a stator inductance, $T_{e,ref}$ is the torque reference and $\delta_{max}$ is the pre-defined maximum allowed stator flux linkage load angle.

2. The apparatus of claim 1, wherein the means are configured to: cause the drive to operate in the stator flux assistance operating mode only in response to the stator flux linkage load angle reference reaching or exceeding the pre-defined maximum allowed stator flux linkage load angle while the stator flux linkage reference is below a pre-defined maximum allowed stator flux linkage.

3. The apparatus of claim 2, wherein the pre-defined maximum allowed stator flux linkage corresponds to an upper limit of a linear modulation range for an inverter of the drive.

4. The apparatus of claim 1, wherein the means are configured to:

calculate an excitation current for providing unity power factor operation in a steady state based at least on the stator flux linkage reference and the torque reference;

use, during operation in the stator flux assistance operating mode, the excitation current for providing unity power factor operation in the steady state as an excitation current reference; and/or use, during operation in the primary operating mode, a minimum of a nominal stator flux linkage and the pre-defined maximum allowed stator flux linkage as the stator flux linkage reference and the excitation current for providing the unity power factor operation in the steady state as the excitation current reference.

5. The apparatus of claim 4, wherein the means are configured to:

calculate the excitation current $i_{f,upf}$ for providing the unity power factor operation in the steady state, if the externally excited synchronous motor is a salient pole motor, according to $$i_{f,upf} = \frac{\psi_{s,ref}^2 + L_{sd}L_{sq}\frac{T_{e,ref}^2}{\psi_{s,ref}^2}}{L_{md}\sqrt{\psi_{s,ref}^2 + L_{sq}^2\frac{T_{e,ref}^2}{\psi_{s,ref}^2}}}$$

or, if the externally excited synchronous motor is a non-salient pole motor, according to $$i_{f,upf} = \frac{\sqrt{\psi_{s,ref}^2 + L_s^2 \frac{T_{e,ref}^2}{\psi_{s,ref}^2}}}{L_m},$$

wherein $\psi_{s,ref}$ is the stator flux linkage reference, $L_{sd}$ is a d-axis stator inductance, $L_{sq}$ is a q-axis stator inductance, $L_s$ is a stator inductance, $T_{e,ref}$ is a torque reference, $L_{md}$ is a d-axis magnetizing inductance and $L_m$ is a magnetizing inductance.

6. The apparatus of claim 4, wherein the means are further configured to perform, during operation in the stator flux assistance operating mode:
in response to the excitation current for providing the unity power factor operation being calculated to be smaller than a pre-defined maximum excitation current, calculating the increased stator flux linkage for allowing operation with the unity power factor and with the pre-defined maximum allowed stator flux linkage load angle based on the torque reference and the pre-defined maximum allowed stator flux linkage load angle and using the calculated increased stator flux linkage for allowing operation with the unity power factor and with the pre-defined maximum allowed stator flux linkage load angle as the stator flux linkage reference; and/or
in response to the excitation current for providing the unity power factor operation being calculated to be larger than or equal to the pre-defined maximum excitation current, calculating the increased stator flux linkage for allowing operation with the maximized sub-unity power factor and with the pre-defined maximum allowed stator flux linkage load angle based on the torque reference, the pre-defined maximum allowed stator flux linkage load angle and the pre-defined maximum excitation current and using the calculated increased stator flux linkage for allowing operation with the maximized sub-unity power factor and with the pre-defined maximum allowed stator flux linkage load angle as the stator flux linkage reference.

7. The apparatus of claim 6, wherein the means are configured to:
perform the calculating of the increased stator flux linkage $\psi_{s,ass}$ for allowing operation with the unity power factor, if the externally excited synchronous motor is a salient pole motor, according to $$\psi_{s,ass} = \sqrt{\frac{L_{sq}T_{e,ref}}{\tan(\delta_{max})}}$$

or, if the externally excited synchronous motor is a non-salient pole motor, according to $$\psi_{s,ass} = \sqrt{\frac{L_s T_{e,ref}}{\tan(\delta_{max})}},$$

wherein $L_{sq}$ is a q-axis stator inductance, $L_s$ is a stator inductance, $T_{e,ref}$ is the torque reference, $\delta_{max}$ is the pre-defined maximum allowed stator flux linkage load angle.

8. The apparatus of claim 6, wherein the means are configured to:
perform the calculating of the increased stator flux linkage for allowing operation with the maximized sub-unity power factor, if the externally excited synchronous motor is a salient pole motor, according to $$\psi_{s,ass} = \frac{-B + \sqrt{B^2 - 4AC}}{2A}$$

with $\begin{cases} A = (L_{sd} - L_{sq})\sin(\delta_{max})\cos(\delta_{max}) \\ B = L_{md}L_{sq}i_{f,max}\sin(\delta_{max}) \\ C = -L_{sd}L_{sq}T_{e,ref} \end{cases}$ or, if the externally excited synchronous motor is a non-salient pole motor, according to $$\psi_{s,ass} = \frac{L_s T_{e,ref}}{L_m i_{f,max}\sin(\delta_{max})},$$

wherein $L_{sq}$ is a q-axis stator inductance, $L_{sd}$ is a d-axis stator inductance, $L_s$ is a stator inductance, $T_{e,ref}$ is a torque reference, $\delta_{max}$ is the pre-defined maximum allowed stator flux linkage load angle, $L_{md}$ is a d-axis magnetizing inductance, $L_m$ is a magnetizing inductance and $i_{f,max}$ is the pre-defined maximum excitation current.

9. The apparatus of claim 1, wherein the means are further configured to perform:
in response to the stator flux linkage load angle reference equaling or exceeding the pre-defined maximum allowed stator flux linkage load angle while the stator flux linkage reference is equal to a pre-defined maximum allowed stator flux linkage, causing the drive to operate in an overexcitation operating mode, wherein, in the overexcitation operating mode, the pre-defined maximum allowed stator flux linkage is used as the stator flux linkage reference and an increased excitation current for allowing operation with the pre-defined maximum allowed stator flux linkage and the pre-defined maximum allowed stator flux linkage load angle with a maximized sub-unity power factor is used as an excitation current reference, said increased excitation current being increased relative to an excitation current providing unity power factor.

10. The apparatus of claim 9, wherein the means are configured to:
calculate, during operation in the overexcitation operating mode, the increased excitation current for allowing operation with the pre-defined maximum allowed stator flux linkage and the pre-defined maximum allowed stator flux linkage load angle at least based on the torque reference, the stator flux linkage reference and the pre-defined maximum allowed stator flux linkage load angle.

11. The apparatus of claim 9, wherein the means are configured to:
calculate, during operation in the overexcitation operating mode, the increased excitation current $i_{f,oex}$ for allowing operation with the pre-defined maximum allowed stator flux linkage and the pre-defined maximum allowed stator flux linkage load angle, if the externally excited synchronous motor is a salient pole motor, according to $$i_{f,oex} = \frac{L_{sd}L_{sq}T_{e,ref} - (L_{sd} - L_{sq})\psi_{s,ref}^2 \sin(\delta_{max})\cos(\delta_{max})}{L_{md}L_{sq}\psi_{s,ref}\sin(\delta_{max})}$$

or, if the externally excited synchronous motor is a non-salient pole motor, according to $$i_{f,oex} = \frac{L_s T_{e,ref}}{L_m \psi_{s,ref} \sin(\delta_{max})},$$

wherein $L_{sd}$ is a d-axis stator inductance, $L_{sq}$ is a q-axis stator inductance, $T_{e,ref}$ is a torque reference, $L_{md}$ is a d-axis magnetizing inductance, $\psi_{s,ref}$ is the stator flux linkage reference being here equal to the pre-defined maximum allowed stator flux linkage, $\delta_{max}$ is the pre-defined maximum allowed stator flux linkage load angle, $L_s$ is a stator inductance and $L_m$ is a magnetizing inductance.

12. The apparatus of claim 1, wherein the pre-defined maximum allowed stator flux linkage load angle for steady state operation is larger than 0° and smaller than 90°, preferably smaller than 80°.

13. An electric drive configured to drive an externally excited synchronous motor, the electric drive comprising a computing device comprising a processor, and a memory storing instructions that, when executed by the processor, cause the computing device to:
cause the electric drive to operate in a primary operating mode for achieving unity power factor;
monitor at least a stator flux linkage load angle reference, a stator flux linkage reference and a torque reference defined for control of the externally excited synchronous motor by the electric drive; and
in response to the stator flux linkage load angle reference, in a steady state, reaching or exceeding a pre-defined maximum allowed stator flux linkage load angle for steady state operation, cause the electric drive to operate in a stator flux assistance operating mode, wherein, in the stator flux assistance operating mode, an increased stator flux linkage for allowing operation with the pre-defined maximum allowed stator flux linkage load angle with unity or with at least maximized sub-unity power factor is used as the stator flux linkage reference, the increased stator flux linkage being increased relative to a stator flux linkage usable in the primary operating mode as the stator flux linkage reference; wherein the means are configured to perform during operation in the stator flux assistance operating mode:
calculating the increased stator flux linkage for allowing the operation with the pre-defined maximum allowed stator flux linkage load angle with unity power factor based on the torque reference and the pre-defined maximum allowed stator flux linkage load angle;
and using the calculated increased stator flux linkage for allowing the operation with the pre-defined maximum allowed stator flux linkage load angle with unity power factor as the stator flux linkage reference;
wherein the means are configured to: calculate, during operation in the stator flux assistance operating mode, the increased stator flux linkage for allowing the operation with the pre-defined maximum allowed stator flux linkage load angle with unity power factor $\psi_{s,ass}$, if the externally excited synchronous motor is a salient pole motor, according to:

$$\psi_{s,ass} = \sqrt{\frac{L_{sq}T_{e,ref}}{\tan(\delta_{max})}}$$

or, if the externally excited synchronous motor is a non-salient pole motor, according to $$\psi_{s,ass} = \sqrt{\frac{L_s T_{e,ref}}{\tan(\delta_{max})}},$$

wherein $L_{sq}$ is a q-axis stator inductance, $L_s$ is a stator inductance, $T_{e,ref}$ is the torque reference and $\delta_{max}$ is the pre-defined maximum allowed stator flux linkage load angle.

14. A method comprising: causing a drive for driving an externally excited synchronous motor to operate in a primary operating mode for achieving unity power factor;
monitoring at least a stator flux linkage load angle reference, a stator flux linkage reference and a torque reference defined for control of the externally excited synchronous motor by the drive; and in response to the stator flux linkage load angle reference, in a steady state, reaching or exceeding a pre-defined maximum allowed stator flux linkage load angle for steady state operation, causing the drive to operate in a stator flux assistance operating mode, wherein, in the stator flux assistance operating mode, an increased stator flux linkage for allowing operation with the pre-defined maximum allowed stator flux linkage load angle with unity or with at least maximized sub-unity power factor is used as the stator flux linkage reference, the increased stator flux linkage being increased relative to a stator flux linkage usable in the primary operating mode as the stator flux linkage reference; wherein the means are configured to perform during operation in the stator flux assistance operating mode:
calculating the increased stator flux linkage for allowing the operation with the pre-defined maximum allowed stator flux linkage load angle with unity power factor based on the torque reference and the pre-defined maximum allowed stator flux linkage load angle;
and using the calculated increased stator flux linkage for allowing the operation with the pre-defined maximum allowed stator flux linkage load angle with unity power factor as the stator flux linkage reference;
wherein the means are configured to: calculate, during operation in the stator flux assistance operating mode, the increased stator flux linkage for allowing the operation with the pre-defined maximum allowed stator flux linkage load angle with unity power factor $\psi_{s,ass}$, if the externally excited synchronous motor is a salient pole motor, according to:

$$\psi_{s,ass} = \sqrt{\frac{L_{sq}T_{e,ref}}{\tan(\delta_{max})}}$$

or, if the externally excited synchronous motor is a non-salient pole motor, according to $$\psi_{s,ass} = \sqrt{\frac{L_s T_{e,ref}}{\tan(\delta_{max})}},$$

wherein $L_{sq}$ is a q-axis stator inductance, $L_s$ is a stator inductance, $T_{e,ref}$ is the torque reference and $\delta_{max}$ is the pre-defined maximum allowed stator flux linkage load angle.

15. A computer program product comprising program instructions embodied on a non-transitory computer readable medium for performing at least the following:
    causing a drive for driving an externally excited synchronous motor to operate in a primary operating mode for achieving unity power factor;
    monitoring at least a stator flux linkage load angle reference, a stator flux linkage reference and a torque reference defined for control of an externally excited synchronous motor by the drive; and
    in response to the stator flux linkage load angle reference, in a steady state, reaching or exceeding a pre-defined maximum allowed stator flux linkage load angle for steady state operation, causing the drive to operate in a stator flux assistance operating mode, wherein, in the stator flux assistance operating mode, an increased stator flux linkage for allowing operation with the pre-defined maximum allowed stator flux linkage load angle with unity or with at least maximized sub-unity power factor is used as the stator flux linkage reference, the increased stator flux linkage being increased relative to a stator flux linkage usable in the primary operating mode as the stator flux linkage reference;
    wherein the means are configured to perform during operation in the stator flux assistance operating mode:
    calculating the increased stator flux linkage for allowing the operation with the pre-defined maximum allowed stator flux linkage load angle with unity power factor based on the torque reference and the pre-defined maximum allowed stator flux linkage load angle;
    and using the calculated increased stator flux linkage for allowing the operation with the pre-defined maximum allowed stator flux linkage load angle with unity power factor as the stator flux linkage reference;
    wherein the means are configured to: calculate, during operation in the stator flux assistance operating mode, the increased stator flux linkage for allowing the operation with the pre-defined maximum allowed stator flux linkage load angle with unity power factor $\psi_{s,ass}$, if the externally excited synchronous motor is a salient pole motor, according to:

$$\psi_{s,ass} = \sqrt{\frac{L_{sq} T_{e,ref}}{\tan(\delta_{max})}}$$

or, if the externally excited synchronous motor is a non-salient pole motor, according to $$\psi_{s,ass} = \sqrt{\frac{L_s T_{e,ref}}{\tan(\delta_{max})}},$$

wherein $L_{sq}$ is a q-axis stator inductance, $L_s$ is a stator inductance, $T_{e,ref}$ is the torque reference and $\delta_{max}$ is the pre-defined maximum allowed stator flux linkage load angle.

* * * * *